Patented Oct. 4, 1932

1,880,701

UNITED STATES PATENT OFFICE

FREDERICK W. BINNS, OF WOLLASTON, AND JOSEPH M. LURIE, OF JAMAICA PLAIN, MASSACHUSETTS, ASSIGNORS TO VIRGINIA SMELTING COMPANY, OF PORTLAND, MAINE, A CORPORATION OF MAINE

METHOD FOR EFFECTING BISULPHITE REACTIONS WITH SULPHUR DIOXIDE IN SUBSTANTIALLY NEUTRAL SOLUTIONS

No Drawing.   Application filed December 15, 1926.   Serial No. 155,102.

This invention provides a new and improved method for the conversion of elements or compounds into sulphites or like derivatives.

In various industrial processes as now carried out in the several arts, there are many instances involving the reaction of a substance or compound with bisulphite radical to form direct addition products and other derivatives of this sort. For this purpose, it is common practice to employ bisulphite salts, and usually sodium bisulphite. These compounds are especially reactive but relatively expensive. Moreover they involve certain disadvantages of operation and wastes of reagent material. Thus, the sodium content of sodium bisulphite is usually ineffective with respect to the composition of the ultimate sulphite product per se, and frequently at the end of such reactions is found in chemical association with a part of the sulphite or other radical in the form of a normal salt, such as sodium sulphite, which is either a waste byproduct or requires reconversion in order to be available for further use.

Accordingly, it is an object of the present invention to provide a convenient and more efficient method for carrying out such chemical reactions or treatments. It is a further object of the invention to effect the reaction by the substantially direct addition of sulphur dioxide as the starting material, in the gaseous or liquid condition or in the form of a solution. Other objects will be clear from the following disclosure.

In general, the method of the invention includes subjecting a sulphite reactive substance or compound (as hereinafter more specifically defined) to the introduction of sulphur dioxide, (in predetermined amounts,— and preferably in a gaseous stream so controlled as to provide a regulated hydrogen ion concentration) in the presence of a small proportion of buffer reagent which is characterized by manifesting a relatively low acidity with respect to bisulphite radical. The invention is also applicable to those operations in which the action of bisulphite ion or radical may be employed leading to products, the formation and constitution of which are not precisely determinable or which may even not contain the sulphite.

By the term "bisulphite-reactive substance or compound" as herein employed are generally to be comprehended those materials (which may be chemical elements or compounds) which react in a desired manner, with or in the presence of a metallic bisulphite salt, as by combination with sulphite or bisulphite radical, but which are not effectively so reacted upon, if at all, by sulphur dioxide or sulphurous acid alone.

The buffer reagent is characteristically employed in relatively small proportions with respect to the principal components of the reaction and may consist of a salt of a strong base and an acid radical equivalent to or weaker than the sulphurous acid radical,—such as sodium sulphite,—and is characterized by effecting the rapid conversion of sulphur dioxide or an aqueous solution thereof to a soluble bisulphite. Thus, sodium sulphite as well as salts of weaker acids, reacts with sulphurous acid to produce sodium bisulphite. It may therefore also include the addition of any metallic base which manifests such properties of combining with sulphurous acid or sulphur dioxide to form a soluble bisulphite. A further qualification in practical operations is that the reagent shall be readily soluble in water and in the presence of the several reagents which may be brought into contact therewith during the process.

As a specific and representative example of the application of the invention in actual practice, it will be described as carried out for the manufacture of Neville-Winthers acid (1—4 naphthol sulphonic acid).

Heretofore this compound, which has a composition represented by the formula:

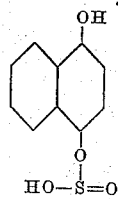

or 1—4 naphthol sulphonic acid, has been prepared by the reaction of sodium naphthionate with two or more molecular equivalents of sodium bisulphite followed by acidification and removal of unconverted naphthionic acid, hydrolysis of the sulphite esters (by boiling with sodium hydroxide) and finally converting the sodium salt to the acid by the addition of hydrochloric acid, and salting out from solution with sodium chloride. This is indicated by the following equations:

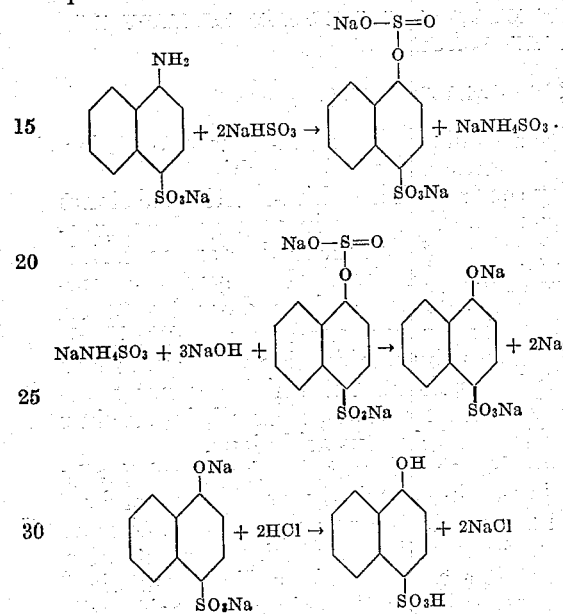

For the preparation of this product in accordance with the present invention, sodium naphthionate say 100 grams, is dissolved in about twice its weight of water and a given amount, about 10 grams, of sodium bisulphite is then added (or its equivalent of buffer reagent as defined above) which is converted to sulphite during the course of the subsequent reactions. The solution is then preferably heated to the boiling point.

Sulphur dioxide gas is now passed into the solution rapidly until a precipitate occurs. The rapidity of the gaseous stream is then reduced, or stopped whereupon the precipitate redissolves. The stream is thereafter continued and preferably controlled to such a rate that the gas is continuously absorbed by the solution and no further precipitate is formed. The sulphur dioxide is thus added in a total amount equal to or about slightly greater than the theoretical equivalent required to convert the sodium naphthionate to its sulphite ester. With the charge above indicated, (deducting the sulphur dioxide equivalent of $NaHSO_3$ used) this is about 34 grams of sulphur dioxide. The stream of gas is then cut off and the solution allowed to cool.

In this operation the acidity or hydrogen ion concentration of the solution is regulated by the sodium sulphite and bisulphite which act as a buffer reagent and in effect prevent the solution from becoming sufficiently acid to acidify and precipitate the naphthionic acid. On the other hand, it permits the solution to be maintained at a sufficient degree of acidification with respect to the sulphite radical, for the esterifying reaction to proceed to substantial completion.

Hydrochloric acid may then be added to the cool solution in sufficient quantity to precipitate any unconverted sodium naphthionate as naphthionic acid which is filtered off or otherwise removed. The remaining solution of sulphite ester is then hydrolyzed by adding approximately 33 grams of sodium hydroxide and boiling. This also serves to expel the ammonia formed during the reaction. The solution is then acidified with a strong acid such as hydrochloric acid to convert the sodium salt to Neville-Winthers acid which may be salted out by the addition of common salt.

In the procedure thus provided, a relatively small amount of the buffer reagent (sodium sulphite and sodium bisulphite) is required and the the main reaction is primarily (or eventually) effected by the direct interaction of sulphur dioxide and the naphthionate nucleus. Therefore, it is not only simple in operation but avoids the use of numerous reagents, the occurrence of side reactions and the presence of resultant by-products which render the product less pure and difficult of purification as well as more expensive to prepare. Moreover, the yield obtained by the method described is high and the reaction may be easily and efficiently carried out in ordinary equipment and on a commercial scale.

It will be readily apparent that numerous other modifications and adaptations of the invention may be made with respect to both the compounds initially employed and the derivative desired, as well as the corresponding sequence of procedures required. But such modifications, and adaptations and substitutions of material are to be understood as comprehended by the above disclosure and included by the following claims.

We claim:

1. A method for the preparation of Neville-Winthers acid (1—4 naphthol sulphonic acid) which comprises the steps of subjecting an aqueous solution of a soluble naphthionate to a stream of sulphur dioxide, in an amount approximately equal to its reaction equivalent and in the presence of approximately 25% or less of a buffer salt.

2. A method for the preparation of Neville-Winthers acid (1—4 naphthol sulphonic acid) which comprises the steps of subjecting an aqueous solution of a soluble naphthionate, in the presence of approximately 25% or less of a salt of a weaker acid than naphthionic acid, to a controlled stream of sulphur dioxide in an amount approximately equal to its reaction equivalent.

3. A method for the preparation of Neville-Winthers acid (1—4 naphthol sulphonic acid) which comprises the steps of subjecting an aqueous solution of a soluble naphthionate and approximately 25% or less of a buffer salt to a controlled stream of sulphur dioxide, in an ultimate amount approximately equal to its reaction equivalent.

4. A method for the preparation of Neville-Winthers acid (1—4 naphthol sulphonic acid) which comprises the steps of subjecting a solution of a soluble naphthionate to a controlled concentration of sulphur dioxide in the presence of approximately 25% or less of a buffer salt.

5. A method for the preparation of Neville-Winthers acid (1—4 naphthol sulphonic acid) which comprises the steps of subjecting a solution of a soluble naphthionate to a controlled concentration, less than approximately 25% with respect thereto, of sulphite and bisulphite radicals in the presence of the continued addition of sulphur dioxide.

6. A method for the preparation of Neville-Winthers acid (1—4 naphthol sulphonic acid (which comprises the steps of subjecting a solution of a soluble naphthionate to a regulated supply of sulphur dioxide in the presence of a solution containing approximately 25% or less of sodium bisulphite.

7. A method for the preparation of Neville-Winthers acid (1—4 naphthol sulphonic acid) which comprises the steps of subjecting a solution of a soluble naphthionate to a regulated supply of sulphur dioxide, in the ultimate proportion of substantially molecular equivalents, in the presence of a solution containing approximately 25% or less of sodium bisulphite.

Signed by us at Boston, Massachusetts, this 13th day of December, 1926.

FREDERICK W. BINNS.
JOSEPH M. LURIE.